United States Patent
Wada et al.

(10) Patent No.: US 9,146,444 B2
(45) Date of Patent: Sep. 29, 2015

(54) LIQUID CRYSTAL ELEMENT AND CELL FOR LIQUID CRYSTAL ELEMENT

(75) Inventors: Masanori Wada, Otsu (JP); Takasi Akimoto, Nagahama (JP); Kiichi Ohkubo, Nagahama (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 89 days.

(21) Appl. No.: 14/344,610

(22) PCT Filed: Sep. 10, 2012

(86) PCT No.: PCT/JP2012/073027
§ 371 (c)(1),
(2), (4) Date: Mar. 13, 2014

(87) PCT Pub. No.: WO2013/042565
PCT Pub. Date: Mar. 28, 2013

(65) Prior Publication Data
US 2014/0347619 A1    Nov. 27, 2014

(30) Foreign Application Priority Data

Sep. 20, 2011  (JP) ................................. 2011-204121

(51) Int. Cl.
*G02F 1/1339* (2006.01)
*G02F 1/29* (2006.01)
(Continued)

(52) U.S. Cl.
CPC ................ *G02F 1/29* (2013.01); *G02F 1/1339* (2013.01); *G02F 1/1341* (2013.01); *G02F 1/13471* (2013.01); *G02F 2001/294* (2013.01); *G02F 2202/28* (2013.01)

(58) Field of Classification Search
CPC . G02F 2001/294; G02F 2202/28; G02F 1/29; G02F 1/1339; G02F 1/1341; G02F 1/13471
USPC .................................. 349/153–154, 200–202
See application file for complete search history.

(56) References Cited

U.S. PATENT DOCUMENTS 4,068,923 A * 1/1978 Toida ............................ 349/132
4,308,442 A * 12/1981 Sallin et al. ................... 219/604
(Continued)

FOREIGN PATENT DOCUMENTS

JP    02-296222 A    12/1990
JP    05-066408 A     3/1993
(Continued)

OTHER PUBLICATIONS

Official Communication issued in International Patent Application No. PCT/JP2012/073027, mailed on Nov. 20, 2012.
(Continued)

*Primary Examiner* — James Dudek
(74) *Attorney, Agent, or Firm* — Keating & Bennett, LLP

(57) ABSTRACT

Provided is a liquid crystal element in which the liquid crystal layer shows less thickness variation. A spacer 12 includes a first spacer 12*a*, a second spacer 12*b* made of resin, and a third space 12*c* made of resin. The first spacer 12*a* is formed of an annular glass or metal sheet in which an opening 12*a*1 constituting an interior space 18 is formed. The second spacer 12*b* has a smaller thickness than the first spacer 12*a*. The third spacer 12*c* has a smaller thickness than the first spacer 12*a*. An opening 12*b*2, 12*c*2 connected to the opening 12*a*1 in the first spacer 12*a* and constituting an inlet 17 is formed in at least one of the second and third spacers 12*b*, 12*c*.

6 Claims, 2 Drawing Sheets

(51) Int. Cl.
*G02F 1/1347* (2006.01)
*G02F 1/1341* (2006.01)

(56) References Cited

U.S. PATENT DOCUMENTS

| | | | |
|---|---|---|---|
| 6,495,262 B2 * | 12/2002 | Igeta | 428/426 |
| 2003/0001999 A1 * | 1/2003 | Kim et al. | 349/139 |
| 2007/0171350 A1 * | 7/2007 | Andoh | 349/153 |

FOREIGN PATENT DOCUMENTS

| | | |
|---|---|---|
| JP | 2002-296604 A | 10/2002 |
| JP | 2007-114721 A | 5/2007 |
| JP | 2011-175104 A | 9/2011 |

OTHER PUBLICATIONS

English translation of Official Communication issued in corresponding International Application PCT/JP2012/073027, mailed on Apr. 3, 2014.

* cited by examiner

LIQUID CRYSTAL ELEMENT AND CELL FOR LIQUID CRYSTAL ELEMENT

TECHNICAL FIELD

This invention relates to liquid crystal elements and cells for liquid crystal elements.

BACKGROUND ART

Liquid crystal elements, such as a liquid crystal lens, are conventionally known which can be changed in optical properties by changing the state of alignment of liquid crystal molecules. For example, in order that such a liquid crystal lens exhibits a high lens power, the liquid crystal layer needs to be increased in thickness. However, if the liquid crystal layer is increased in thickness, there arises a problem of reduced speed of response of the liquid crystal lens to voltage application thereto.

In view of the foregoing, for example, Patent Literature 1 proposes that a plurality of thin liquid crystal layers are arranged along the direction of the optical axis to increase the speed of response of the liquid crystal lens to voltage application thereto. Patent Literature 1 describes that a spacer for keeping the liquid crystal layer at a predetermined thickness is formed of an adhesive containing spherical spacers of 20 μm diameter dispersed therein.

CITATION LIST

Patent Literature

Patent Literature 1: JP-A-2007-114721

SUMMARY OF INVENTION

Technical Problem

Although the optical properties of the liquid crystal element greatly depend upon the thickness of the liquid crystal layer, the liquid crystal element described in Patent Literature 1 has a problem in that the liquid crystal layer is likely to has a thickness variation.

An object of the present invention is to provide a liquid crystal element in which the liquid crystal layer shows less thickness variation.

Solution to Problem

A liquid crystal element according to the present invention includes a first glass sheet, a second glass sheet, a spacer, and a liquid crystal layer. The second glass sheet is disposed facing the first glass sheet. The spacer is disposed between the first glass sheet and the second glass sheet. The spacer defines an interior space including an inlet together with the first and second glass sheets. The liquid crystal layer is provided in the interior space. The spacer includes a first spacer, a second spacer made of resin, and a third space made of resin. The first spacer is formed of an annular glass or metal sheet in which an opening constituting the interior space is formed. The second spacer is disposed between the glass sheet and the first spacer. The second spacer has a smaller thickness than the first spacer. The third spacer is disposed between the glass sheet and the first spacer. The third spacer has a smaller thickness than the first spacer. An opening connected to the opening in the first spacer and constituting the inlet is formed in at least one of the second and third spacers.

Each of the second and third spacers preferably has a thickness not more than 1.0 times the thickness of the first spacer.

The first spacer preferably has a thickness of not more than 400 μm.

Each of the first and second glass sheets preferably has a thickness of not more than 500 μm.

The first spacer preferably has a coefficient of thermal expansion of not more than $50 \times 10^{-7}/°C$.

A cell for a liquid crystal element according to the present invention includes a first glass sheet, a second glass sheet, and a spacer. The second glass sheet is disposed facing the first glass sheet. The spacer is disposed between the first glass sheet and the second glass sheet. The spacer defines an interior space together with the first and second glass sheets. The interior space includes an inlet. The interior space is capable of being filled with liquid crystal. The spacer includes a first spacer, a second spacer made of resin, and a third space made of resin. The first spacer is formed of an annular glass or metal sheet in which an opening constituting the interior space is formed. The second spacer is disposed between the glass sheet and the first spacer. The second spacer has a smaller thickness than the first spacer. The third spacer is disposed between the glass sheet and the first spacer. The third spacer has a smaller thickness than the first spacer. An opening connected to the opening in the first spacer and constituting the inlet is formed in at least one of the second and third spacers.

Advantageous Effects of Invention

The present invention can provide a liquid crystal element in which the liquid crystal layer shows less thickness variation.

DESCRIPTION OF EMBODIMENTS

Figure 1:
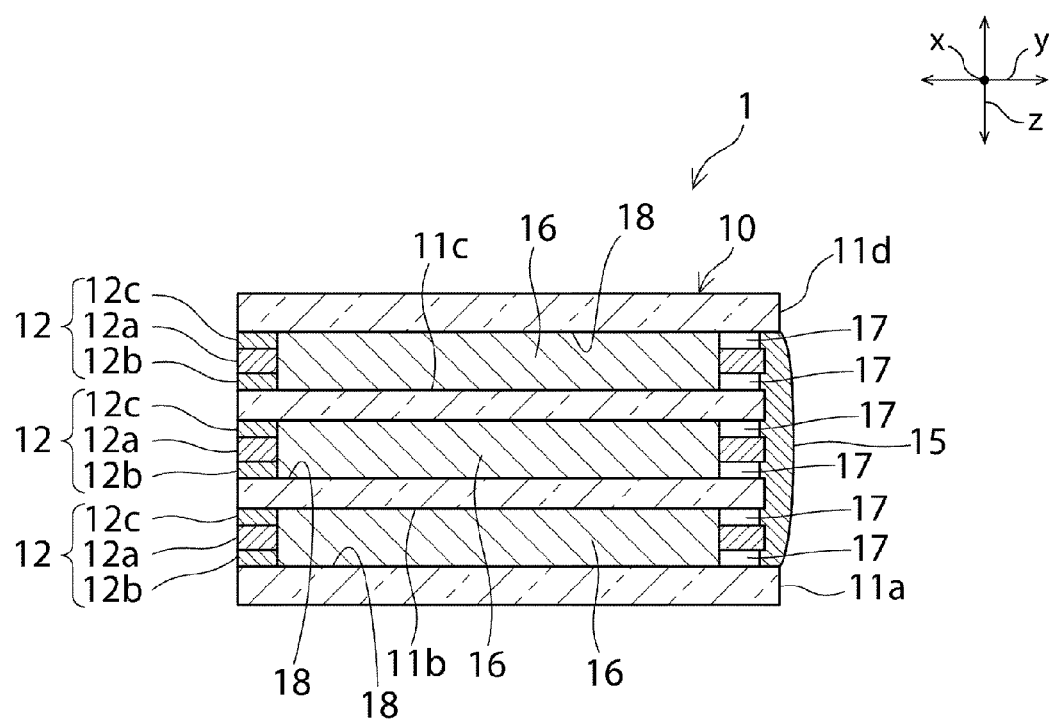
FIG. 1 is a schematic cross-sectional view of a liquid crystal element according to one embodiment of the present invention.

Hereinafter, a description will be given of an example of a preferred embodiment for working of the present invention. However, the following embodiment is simply illustrative. The present invention is not at all intended to be limited to the following embodiment.

Throughout the drawings to which the embodiment and the like refer, elements having substantially the same functions will be referred to by the same reference signs. The drawings to which the embodiment and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

Figure 2:
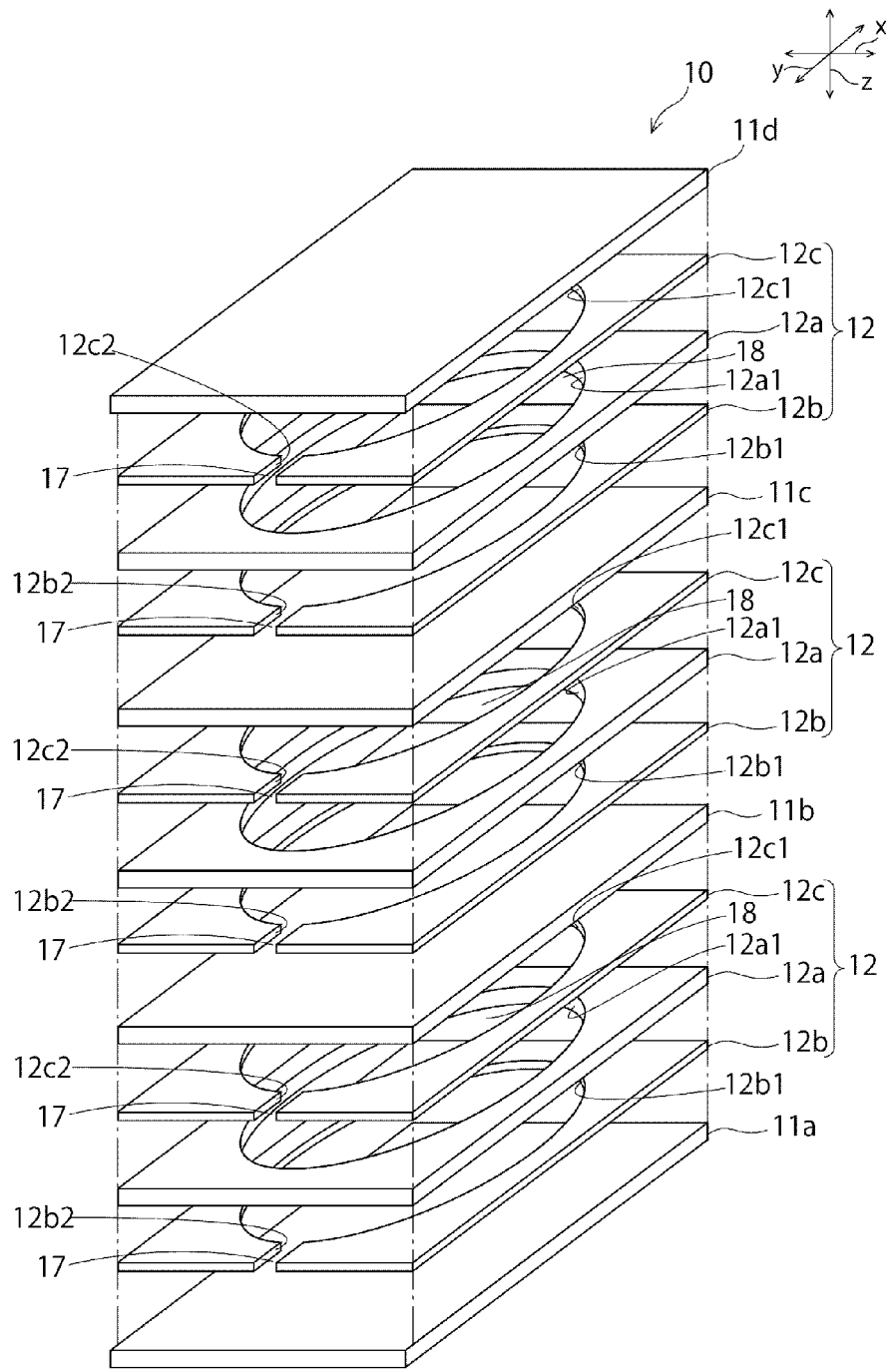
FIG. 2 is a schematic exploded perspective view of an element body in the one embodiment of the present invention.

FIG. 1 is a schematic cross-sectional view of a liquid crystal element 1 according to this embodiment. FIG. 2 is a schematic exploded perspective view of an element body in this embodiment.

The liquid crystal element 1 constitutes a liquid crystal lens. As shown in FIG. 1, the liquid crystal element 1 includes an element body (a cell for a liquid crystal element) 10 and a plurality of liquid crystal layers 16. The element body 10, as shown in FIGS. 1 and 2, includes a plurality of glass sheets 11a to 11d laminated in a z direction (direction of lamination). Each pair of adjacent glass sheets 11a to 11d face each other in the z direction. Among these glass sheets 11a to 11d, the glass sheet 11a located at one outermost end in the z direction constitutes a lower glass sheet, the glass sheet 11d located at the other outermost end in the z direction constitutes an upper glass sheet, and the glass sheets 11b, 11c located between the glass sheet 11a and the glass sheet 11d constitute intermediate glass sheets.

Formed on each of inside principal surfaces of the glass sheet 11a constituting the lower glass sheet and the glass sheet 11d constituting the upper glass sheet are an unshown electrode and an alignment film formed on the electrode. On the other hand, formed on both the principal surfaces of each of the glass sheets 11b, 11c constituting the intermediate glass sheets are alignment films. An electrode may be formed also between each of the glass sheets 11b, 11c and the adjacent alignment film.

No particular limitation is placed on the thickness of the glass sheets 11a to 11d. The glass sheets 11a to 11d may have equal thicknesses or different thicknesses. Normally, the glass sheets 11a, 11d located at uppermost and lowermost ends are relatively thick and the remaining glass sheets 11b, 11c are relatively thin. The thickness of the glass sheets 11a, 11d is preferably 50 μm to 500 μm and more preferably 100 μm to 300 μm. The thickness of the glass sheets 11b, 11c is preferably 10 μm to 400 μm and more preferably 20 μm to 200 μm.

A spacer 12 is disposed between each pair of glass sheets 11a to 11d adjacent in the z direction. The spacer 12 and the pair of glass sheets 11a to 11d adjacent in the z direction define an interior space 18 including an inlet 17 and capable of being filled with liquid crystal. The inlet 17 opens into a side surface of the element body 10. In other words, the interior space 18 is continued through the inlet 17 into the side surface.

Although in this embodiment the shape of the interior space 18 is columnar, no particular limitation is placed on the shape of the interior space in the present invention. The shape of the interior space 18 may be appropriately selected depending upon the shape of a liquid crystal layer 16 to be formed.

The thickness of the spacer 12 can be appropriately selected depending upon the thickness of the liquid crystal layer 16 to be formed. The thickness of the spacer 12 can be, for example, about 10 μm to about 1000 μm. From the viewpoint of increasing the fast response of the liquid crystal element 1, the liquid crystal layer 16 is preferably thin. Therefore, the thickness of the spacer 12 is preferably not more than 900 μm and more preferably not more than 800 μm.

A liquid crystal layer 16 is provided in each of the plurality of interior spaces 18. The liquid crystal layer 16 is sealed with a sealant 15.

A voltage can be applied to the liquid crystal layers 16 by the electrode provided on the glass sheet 11a and the electrode provided on the glass sheet 11d. Thus, the refractive index of the liquid crystal layers 16 is changed. As a result, the lens power of the liquid crystal element 1 is changed.

Next, the structure of the spacer 12 will be described in further detail.

Each of the plurality of spacers 12 includes a first spacer 12a, a second spacer 12b, and a third spacer 12c.

The first spacer 12a is formed of an annular glass or metal sheet. An opening 12a1 (see FIG. 2) constituting the interior space 18 is formed in the first spacer 12a. In this embodiment, specifically, the opening 12a1 constitutes part of the interior space 18. However, the opening 12a1 may constitute the whole of the interior space 18.

The coefficient of thermal expansion of the first spacer 12a preferably not more than $50 \times 10^{-7}/°$ C. and more preferably not more than $45 \times 10^{-7}/°$ C.

The second spacer 12b is disposed between each first spacer 12a and the adjacent glass sheet 11a, 11b, 11c. The second spacer 12b bonds the first spacer 12a to the adjacent glass sheet 11a, 11b, 11c. The second spacer 12b is made of resin. The second spacer 12b may contain, for example, hardened material of a resin adhesive, such as hardened material of an ultraviolet curable resin adhesive, and spherical particles dispersed into the hardened material.

The third spacer 12c is disposed between each first spacer 12a and the adjacent glass sheet 11d, 11c, 11b. The third spacer 12c bonds the first spacer 12a to the adjacent glass sheet 11d, 11c, 11b. The first spacer 12a is sandwiched between the adjacent second spacer 12b and third spacer 12c. The third spacer 12c is made of resin. The third spacer 12c may contain, for example, hardened material of a resin adhesive, such as hardened material of an ultraviolet curable resin adhesive, and spherical particles dispersed into the hardened material.

An opening 12b2, 12c2 which is connected to the interior space 18 partly constituted by the first spacer 12a and constitutes the inlet 17 is formed in at least one of the second and third spacers 12b, 12c. Specifically, openings 12b2, 12c2 which are connected to the interior space 18 partly constituted by the first spacer 12a and constitute the respective inlets 17 are formed in both the second and third spacers 12b, 12c. Furthermore, at least one of the second and third spacers 12b, 12c, specifically, both the second and third spacers 12b, 12c, have respective openings 12b1, 12c1 formed therein and each constituting part of the interior space 18. In other words, the interior space 18 is provided across the first to third spacers 12a to 12c.

Each of the second and third spacers 12b, 12c has a thickness equal to or smaller than the first spacer 12a. Each of the second and third spacers 12b, 12c preferably has a thickness not more than 1.0 times the thickness of the first spacer 12a and more preferably not more than 0.9 times that of the first spacer 12a. However, if the thickness of the second and third spacers 12b, 12c is too small, the bonding strength between the spacer 12 and the glass sheets 11a to 11d may be too low. Therefore, each of the second and third spacers 12b, 12c preferably has a thickness not less than 0.1 times the thickness of the first spacer 12a and more preferably not less than 0.2 times that of the first spacer 12a.

Specifically, the thickness of the first spacer 12a is preferably 10 μm to 400 μm and more preferably 20 μm to 200 μm. The ratio of the thickness of the first spacer 12a to the thickness of the spacer 12 ((thickness of the first spacer 12a)/(thickness of the spacer 12)) is preferably 0.33-0.83 and more preferably 0.40-0.80. The thickness of each of the second spacer 12b and the third spacer 12C is preferably 10 μm to 400 μm and more preferably 10 μm to 200 μm.

The spacer 12 can be produced in the following manner. Specifically, an ultraviolet curable resin adhesive for forming the second spacer 12b is printed on the glass sheet 11a. Next, the first spacer 12a is laid on the ultraviolet curable resin adhesive. Next, an ultraviolet curable resin adhesive for forming the third spacer 12c is printed on at least one of the first spacer 12a and the glass sheet 11b. Thereafter, the glass sheet 11b and the first spacer 12a are laid one on another, they are irradiated with ultraviolet rays while being put under pressure to harden the adhesives. Thus, the second and third spacers 12b, 12c can be hardened, resulting in the completion of the spacer 12.

Meanwhile, as described in Patent Literature 1, it may be conceivable that a spacer for keeping the liquid crystal layer at a predetermined thickness is formed of an adhesive containing spherical spacers of 20 μm diameter dispersed therein. In this case, however, the rigidity of the spacer is low and therefore the liquid crystal layer is likely to have a thickness variation. In addition, it is difficult to keep the thickness of the liquid crystal layer constant.

In view of the above, it is conceivable to form a spacer from a glass sheet having high rigidity. In this case, it is necessary to provide the glass sheet constituting the spacer with an opening constituting an interior space for the provision of a liquid crystal layer and an opening constituting an inlet. Therefore, the glass sheet constituting the spacer has not an annular shape but a horseshoe shape. For this reason, in a region where the opening constituting the inlet is provided and its surrounding region, the distance between glass sheets located on both sides of the spacer will be closer and the interior space thus will be thinner. Hence, the liquid crystal layer varies in thickness between the region surrounding the region where the opening constituting the inlet is provided and the other region. In other words, the liquid crystal layer has a thickness variation.

In contrast, in this embodiment, the spacer 12 is constituted by the first spacer 12a formed of a relatively thick glass sheet or metal sheet and relatively thin resin-made second and third spacers 12b, 12c. Furthermore, the opening 12b2, 12c2 constituting the inlet 17 is formed in at least one of the relatively thin resin-made second and third spacers 12b, 12c. Therefore, as compared with the case where an opening constituting an inlet is formed in the first spacer, the deformation of the glass sheets 11a to 11c can be reduced. Hence, the thickness reduction of the region around the inlet 17 for the liquid crystal layer 16 can be reduced. As a result, a liquid crystal element 1 can be achieved in which the liquid crystal layer 16 shows less thickness variation.

When the first spacer 12a mainly constituting the spacer 12 is made of glass, the temperature dependency of the thickness of the spacer 12 can be reduced. Therefore, the change in thickness of the liquid crystal layer 16 due to change in temperature of the liquid crystal element 1 can be reduced. From the viewpoint of more effectively reducing the change in thickness of the liquid crystal layer 16 due to change in temperature of the liquid crystal element 1, the coefficient of thermal expansion of the first spacer 12a is preferably not more than $50 \times 10^{-7}/^\circ$ C. and more preferably not more than $45 \times 10^{-7}/^\circ$ C.

Furthermore, from the viewpoint of more effectively reducing the thickness variation of the liquid crystal layer 16 and more effectively reducing the temperature dependency of the thickness of the liquid crystal layer 16, the proportion of the first spacer 12a in the spacer 12 is preferably increased. Specifically, each of the second and third spacers 12b, 12c preferably has a thickness not more than 1.0 times the thickness of the first spacer 12a and more preferably not more than 0.9 times that of the first spacer 12a. The ratio of the thickness of the first spacer 12a to the thickness of the spacer 12 ((thickness of the first spacer 12a)/(thickness of the spacer 12)) is preferably not more than 0.83 and more preferably not more than 0.80.

The thickness variation of the liquid crystal layer 16 is likely to occur when the glass sheets 11a to 11d are thin and therefore easily deformable. Therefore, the technique of this embodiment, capable of reducing the thickness variation of the liquid crystal layer 16, is particularly effective when the thickness of the glass sheets 11a to 11d is not more than 500 μm and more particularly effective when the thickness thereof is not more than 300 μm.

In the above embodiment, a description has been given of a liquid crystal lens as an example of an embodiment of the present invention. However, in the present invention, the liquid crystal element is not limited to the liquid crystal lens. The scope of the liquid crystal element includes the liquid crystal lens, a liquid crystal shutter, a liquid crystal display element, and a liquid crystal aperture.

In the above embodiment, a description has been given of an example where the liquid crystal element includes a plurality of glass sheets and a plurality of liquid crystal layers. However, the present invention is not limited to this structure. The liquid crystal element may include a single pair of glass sheets and a single liquid crystal layer disposed between the pair of glass sheets. In the case where the liquid crystal element includes a plurality of liquid crystal layers, a cell for a liquid crystal element may be provided with communication holes providing communication among the plurality of liquid crystal layers. In this case, pressure variations among the plurality of liquid crystal layers can be reduced.

Although in the above embodiment a description has been given of an example where an opening constituting an inlet is formed in each of the second and third spacers, an opening constituting an inlet may be formed in only one of the second and third spacers. Furthermore, a groove constituting part of the inlet may be formed in the first spacer.

REFERENCE SIGNS LIST

1 ... liquid crystal element
10 ... element body
11a to 11d ... glass sheet
12 ... spacer
12a ... first spacer
12a1 ... opening constituting an interior space
12b ... second spacer
12b1 ... opening constituting an interior space
12b2 ... opening constituting an inlet
12c ... third spacer
12c1 ... opening constituting an interior space
12c2 ... opening constituting an inlet
15 ... sealant
16 ... liquid crystal layer
17 ... inlet
18 ... interior space

The invention claimed is:
1. A liquid crystal element comprising:
a first glass sheet;
a second glass sheet disposed facing the first glass sheet;
a spacer disposed between the first glass sheet and the second glass sheet and defining an interior space including an inlet together with the first and second glass sheets; and
a liquid crystal layer provided in the interior space,
wherein
the spacer comprises:
a first spacer formed of an annular glass or metal sheet in which an opening constituting the interior space is formed;
a second spacer made of resin, disposed between the glass sheet and the first spacer, and having a smaller thickness than the first spacer; and a third spacer made of resin, disposed between the glass sheet and the first spacer, and having a smaller thickness than the first spacer, and an opening connected to the opening in the first spacer and constituting the inlet is formed in at least one of the second and third spacers.

2. The liquid crystal element according to claim 1, wherein each of the second and third spacers has a thickness not more than 1.0 times the thickness of the first spacer.

3. The liquid crystal element according to claim 1, wherein the first spacer has a thickness of not more than 400 μm.

4. The liquid crystal element according to claim 1, wherein each of the first and second glass sheets has a thickness of not more than 500 μm.

5. The liquid crystal element according to claim 1, wherein the first spacer has a coefficient of thermal expansion of not more than $50 \times 10^{-7}/°C$.

6. A cell for a liquid crystal element comprising:

a first glass sheet;

a second glass sheet disposed facing the first glass sheet; and a spacer disposed between the first glass sheet and the second glass sheet and defining an interior space including an inlet together with the first and second glass sheets, the interior space being capable of being filled with liquid crystal, wherein the spacer comprises:

a first spacer formed of an annular glass or metal sheet in which an opening constituting the interior space is formed;

a second spacer made of resin, disposed between the glass sheet and the first spacer, and having a smaller thickness than the first spacer; and a third spacer made of resin, disposed between the glass sheet and the first spacer, and having a smaller thickness than the first spacer, and an opening connected to the opening in the first spacer and constituting the inlet is formed in at least one of the second and third spacers.

* * * * *